United States Patent [19]
Schneider et al.

[11] Patent Number: 5,893,191
[45] Date of Patent: Apr. 13, 1999

[54] BACKING SUPPORT FOR SURFACE FINISHING PAD

[75] Inventors: Jim D. Schneider, Pewaukee; Scott S. McLain, Wind Lake, both of Wis.

[73] Assignee: Lake Country Manufacturing, Inc., Hartland, Wis.

[21] Appl. No.: 08/985,599

[22] Filed: Dec. 5, 1997

[51] Int. Cl.$^6$ .................................................. A47L 11/02
[52] U.S. Cl. ........................... 15/230.12; 15/230; 428/95; 428/97
[58] Field of Search ................... 15/230.12, 230.15, 15/230; 428/95, 97

[56] References Cited

U.S. PATENT DOCUMENTS

| | | | |
|---|---|---|---|
| 3,430,283 | 3/1969 | Engel et al. | 15/230.12 |
| 4,324,824 | 4/1982 | Narens et al. | 428/95 |
| 4,403,367 | 9/1983 | Brown et al. | 15/230.12 |
| 5,001,804 | 3/1991 | Roeker et al. | 15/230.12 |
| 5,578,357 | 11/1996 | Fink | 428/95 |

Primary Examiner—Mark Spisich
Assistant Examiner—Theresa T. Snider
Attorney, Agent, or Firm—Andrus, Sceales, Starke & Sawall

[57] ABSTRACT

A supporting base material for a tufted rotary finishing pad utilizes a three-layer laminate including an outer face layer of a crosslinked ionomer resin of ethylene and methacrylic acid copolymers reacted with a metal salt, an intermediate layer of an open polyester mesh, and an inner face layer of a non-woven polyester fiber. The tufted fiber finishing media is attached to the crosslinked ionomer resin face of the laminated base which is preferably heat formed to provide a curved pad edge. The base is extremely tough and durable, provides excellent shape retention, resistance to moisture, and resistance to fiber tear-out.

5 Claims, 1 Drawing Sheet

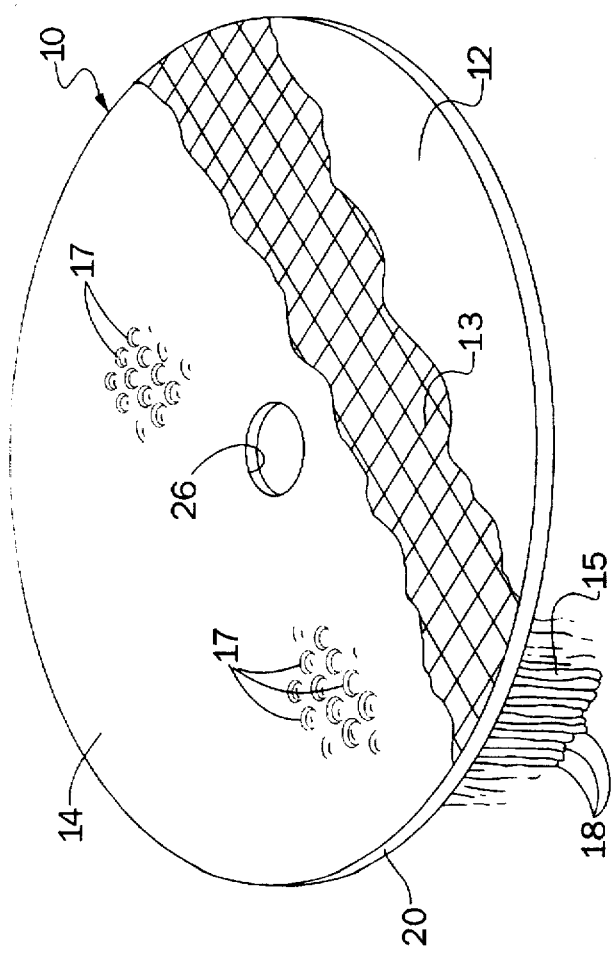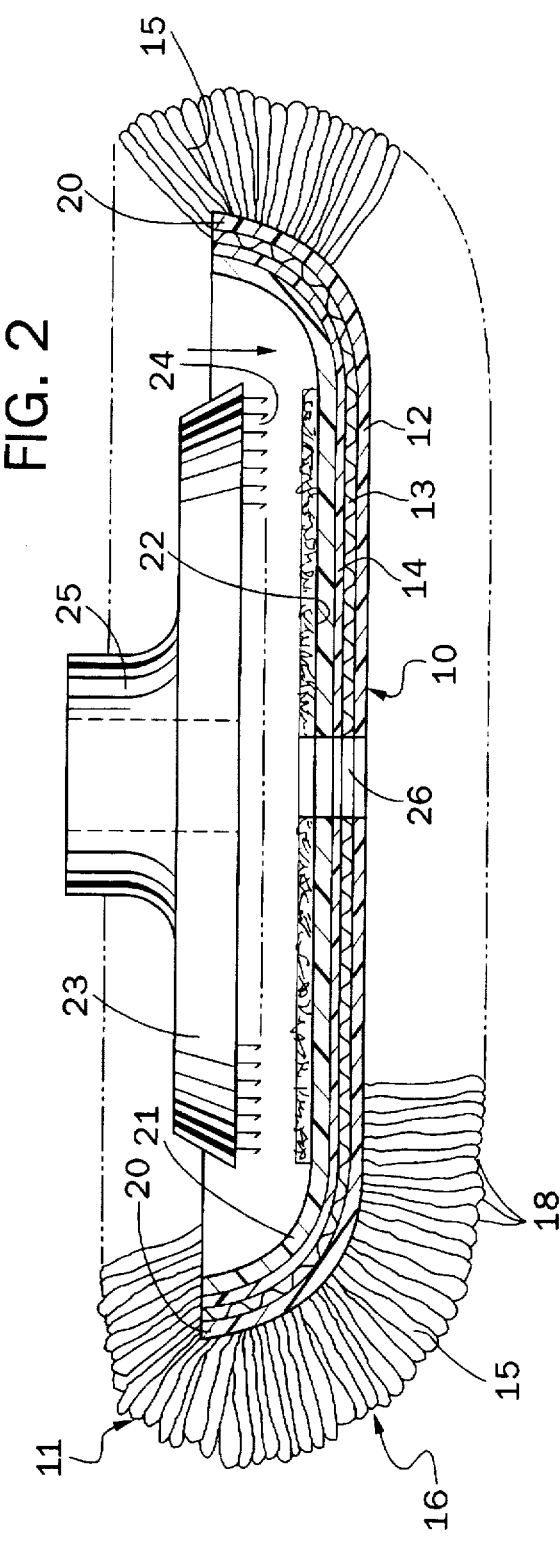

BACKING SUPPORT FOR SURFACE FINISHING PAD

BACKGROUND OF THE INVENTION

The present invention relates to surface finishing pads and, more particularly, to an improved support and backing for the finishing medium of a tufted fiber rotary finishing pad.

Surface finishing pads of tufted fiber construction, used for buffing and polishing a variety of surfaces, are well known in the art. Most typically, these pads are circular in shape and are driven by a rotary buffing machine in which the pads are mounted thereon by use of any of several devices, including threaded connectors and hook and loop fasteners.

Pads using a soft fiber finishing medium commonly use wool yarn, but other synthetic fiber yarns, used alone or blended with wool, are also used. The fiber yarns are typically attached to a stiff, but flexible, base or backing layer by utilizing well known tufting methods and apparatus. Such tufted pads provide a number of distinct advantages in certain surface finishing operations over, for example, open cell polyurethane foam pads. However, tufted finishing pads have a number of deficiencies, most of which relate to the underlying supporting base or backing for the tufted fibers, which backing also provides the interface for attachment to the buffing machine.

The finishing pad support or backing must be rigid enough to retain the pad shape, yet flexible enough to provide some cushioning effect during operation. The industry has generally adopted a laminated construction for the backing used to support tufted fiber finishing media. The backing should be resistant to moisture and water-based cleaning solutions, tough enough to withstand perforation and stitch tear-out during operation, and formable into a curved peripheral edge which will hold its shape during use. One common prior art backing comprises a layer of polyester film laminated between two layers of a woven jute fabric. The jute layers help lock the tufted fabric in place and the polyester layer provides shape retention. In addition, a further polyester backing layer is laminated to the jute surface opposite the tufted face to allow the pad to be heat formed with a circular peripheral edge, as is common in the industry. Unfortunately, jute is not particularly durable, swells in the presence of moisture, and may capture and hold finishing compound in use. An alternate media support and backing utilizes a base laminate comprising a non-woven polyester layer and a solid film of polyester fabric material. The tufted fabric may be first applied to the non-woven layer and the polyester film laminated to the sewn non-woven layer and formed with a curved peripheral edge, if desired. Polyethylene is a commonly used polyester material, but other plastic resin backing and support materials are also utilized. These layered polyester laminates, though somewhat more resistant to water than jute, still soften and lose their shape in use. In addition, these materials do not provide sufficient strength to prevent perforation and stitch tear-out as a result of the high shear forces incurred in use.

A further problem, common to all prior art tufted pads, is the tendency of the fibers to separate from the backing at the peripheral edge of the pad during use. Attempts have been made to add additional reinforcing strips to the edge, and to bond the radially outermost fibers to the backing along the edge. However, prior art backing materials have not proved to provide a satisfactory bond for wool or synthetic fibers, and added reinforcing strips increase the pad cost without providing cost-effective benefit.

SUMMARY OF THE INVENTION

A tufted surface finishing pad of the present invention includes a laminated base to which the tufted fibers are sewn, which base overcomes many of the deficiencies of base and backing members used with prior art tufted pads. Pads made with the base of the present invention have been found to be much more durable than pads of the prior art and retain their shape better throughout full pad life. A tufted pad made in accordance with the present invention includes a laminated base having a layer of open polyester mesh between layers of a non-woven polyester fiber web and a crosslinked ionomer resin film, and a soft fiber finishing medium attached by tufting to the ionomer resin face of the base. The crosslinked ionomer resin preferably comprises ethylene and methacrylic acid copolymers reacted with a metal salt. Such material is manufactured by the DuPont Company and sold under the trademark SURLYN.

The fiber finishing medium preferably comprises wool yarn, but may also comprise synthetic yarns or yarn blends of natural and synthetic fibers.

In a preferred construction, the finishing pad includes a further polyester film backing layer which is laminated to the non-woven polyester face of the base and is heat formed to provide a curved pad edge. The polyester film backing preferably comprises polyethylene.

A surface finishing pad in accordance with the present invention is made by a method which includes the steps of laminating an open polyester mesh between a layer of non-woven polyester and a crosslinked ionomer resin film, and attaching a soft fiber finishing medium to the ionomer resin face of the laminate. The fiber finishing medium is preferably attached by a tufting step.

In one embodiment, the method includes the additional steps of trimming the laminate to a circular shape, and heat forming the laminate to provide a peripheral curved pad edge. Preferably and as part of the heat forming step, a polyester film backing layer is laminated to the non-woven polyester layer of the base.

The step of attaching the fiber medium to the laminate preferably comprises tufting. The fiber medium comprises yarn and may be selected from the group consisting of wool, synthetic fibers and mixtures or blends thereof. The method may also include the step of melt bonding the fibers along the pad edge to the ionomer resin material.

BRIEF DESCRIPTION OF THE DRAWINGS

FIG. 1 is a perspective view of the laminated base for the pad of the present invention with portions broken away to show the various layers.

FIG. 2 is a vertical section through a tufted wool pad of the present invention.

DETAILED DESCRIPTION OF THE PREFERRED EMBODIMENT

FIG. 1 shows a perspective view of a thin flat laminate which is cut to a circular shape and is used as the base 10 for a buffing pad 11, such as is shown in section in FIG. 2. The laminated base 10 includes a front face 12 comprising a film of a tough, flexible crosslinked ionomer resin. Preferably, the ionomer resin comprises ethylene and methacrylic acid copolymers reacted with a metal salt. One particularly preferable resin is DuPont SURLYN, in a film thickness of about 20 mils (0.5 mm). The intermediate layer of the laminated base 10 is an open polyester mesh 13. The mesh size may be about ⅛ inch (about 3 mm), but the mesh size is not believed to be critical. The third layer or rear face 14 of the laminate comprises a thin non-woven polyester fiber mat or layer. The crosslinked ionomer resin layer front face 12 has excellent melt bonding properties and adheres well to the polyester mesh 13 and to the polyester layer 14 comprising the rear face.

Using suitable tufting equipment, wool yarn 15 or other suitable natural, synthetic or blended fiber yarn, is sewn through the base from the rear face 14 in a conventional tufting operation to form a dense cut pile finishing medium 16 on the front face 12 of the base 10, as is shown in FIG. 2. In the tufting operation, individual yarn elements 15 are looped 17 on the rear face with the free ends 18 thereof forming the face of the finishing medium 16.

At this point in the manufacture of the pad 11, the laminated base 10 is flat and the wool yarn finishing media 15 extends generally perpendicularly from the front face 12 thereof. Although the pad may be used in such a flat construction, more typically, the outer peripheral edge 20 of the base 10 is formed to curve toward the rear face 14. This not only provides the base 10 with much greater rigidity, but also causes the wool yarn media 15 to form a curved pad edge which provides greater utility for the finishing pad in use. The peripheral curved pad edge is typically heat formed by pressing the laminated base 10 into a suitably shaped mold and applying heat. The crosslinked ionomer resin front face 12 of the base is extremely well suited for heat forming to provide the preferred curved edge pad construction. However, in order to provide a sufficiently rigid pad, a front face layer 12 substantially greater in thickness than the preferred 20 mil thickness would be desirable. However, cost and other considerations might dictate that stiffness and rigidity for the pad be provided in an alternate manner and using known prior art techniques.

Thus, the pad base 10 with the tufted wool yarn 15 sewn thereto is preferably formed to the curved edge configuration by simultaneously applying and laminating to the rear face 14 a polyester film backing layer 21 and forming the curved edge pad from a composite of the laminated base 10 and the polyester backing layer 21. The backing layer 21 is preferably polyethylene but other suitable thermoplastic materials which will laminate to the base and form a fairly rigid curved edge would also be suitable. The polyester backing layer 21 also serves to lock the yarn loops 17 in place on the rear face 14 of the base to resist pull-out. The pad 11 may be mounted on a conventional buffing machine in any of several alternate ways. As shown in FIG. 2, a sheet 22 of loop material, for a conventional hook and loop-type fastening system, may be bonded or otherwise adhesively attached to the exposed face of the polyethylene backing layer 21. The loop material sheet 22 cooperates with a conventional backing plate 23 to the face of which is attached a sheet 24 of hook material to cooperate with the loop material sheet 22 in a known manner. The backing plate 23 includes a central hub 25 which is internally threaded for attachment to the rotary stub shaft of a conventional buffing machine (not shown). Alternately, the backing plate 23 may be bonded directly to the polyethylene backing layer 21 with a suitable adhesive. In another alternate means for mounting, the laminated base 10 and attached polyester backing layer 21 may be provided with a central hole 26 for receipt of the rotary buffing machine shaft for direct threaded mounting thereto, using a nut and washer (not shown) attached from the front face 12 of the pad base.

The laminated base 10 and the manner in which it is oriented for construction of the pad 11 result in a substantial improvement over prior art pads using natural fiber (e.g. jute), polyester or other thermoplastic pad base materials. The tough crosslinked ionomer resin layer holds its curved edge shape much better than prior art base and backing materials. In addition, the wool yarn fibers 15 adjacent the outer peripheral edge 20 of the base may be adhesively bonded to the ionomer layer 12 when the curved edge is heat formed. In prior art pads, by comparison, the finishing medium fibers, whether natural or synthetic, either do not bond well to the polyester base materials typically used or, in the case of a natural fiber base, such as jute, the fibers will not bond at all. Thus, in prior art pads, edge separation is a persistent problem.

The intermediate polyester mesh layer 13 in the laminated base 10 provides a reinforcement to the base that helps prevent perforation and tear-out of the tufted yarn. The non-woven polyester fiber web forming the rear face 14 of the laminated base provides continuity to the laminate and helps hold the open polyester mesh 13 therein. It should be noted that, in many prior art pads utilizing a polyester laminate for the base, the non-woven fiber web layer constitutes the front face of the pad from which the fiber finishing medium extends. It has been found that the non-woven fiber layer absorbs moisture, softens and does little to maintain the integrity and shape of the pad. These deficiencies are eliminated by providing a pad base 10 with a smooth tough layer of a crosslinked ionomer resin material on the front face. In addition, as previously described, this material adds other outstanding benefits, particularly when used in the construction of a curved finishing pad of the type shown and described herein.

We claim:

1. A surface finishing pad of tufted construction comprising:

a laminated base including a layer of open polyester mesh between layers of a non-woven polyester fiber and a crosslinked ionomer resin film; and, a soft fiber finishing medium attached by tufting to the ionomer resin face of the support.

2. The finishing pad as set forth in claim 1 wherein said crosslinked ionomer resin comprises ethylene and methacrylic acid copolymers reacted with a metal salt.

3. The finishing pad as set forth in claim 1 wherein the fiber finishing medium comprises wool yarn.

4. The finishing pad as set forth in claim 1 including a polyester film backing layer laminated to the non-woven polyester face of the support and heat formed to provide a peripheral curved pad edge.

5. The finishing pad as set forth in claim 4 wherein said polyester film comprises polyethylene.

* * * * *